(12) United States Patent
Inoue

(10) Patent No.: US 11,544,825 B2
(45) Date of Patent: Jan. 3, 2023

(54) IMAGE PROCESSING APPARATUS, IMAGE PROCESSING SYSTEM, AND IMAGE PROCESSING METHOD

(71) Applicant: INO Graphics, Inc., Tokyo (JP)

(72) Inventor: Yoshiyuki Inoue, Tokyo (JP)

(73) Assignee: INO GRAPHICS, INC., Tokyo (JP)

( * ) Notice: Subject to any disclaimer, the term of this patent is extended or adjusted under 35 U.S.C. 154(b) by 122 days.

(21) Appl. No.: 17/207,888

(22) Filed: Mar. 22, 2021

(65) Prior Publication Data

US 2021/0304376 A1 Sep. 30, 2021

(30) Foreign Application Priority Data

Mar. 24, 2020 (JP) .............................. JP2020-052164

(51) Int. Cl.
*G06T 5/00* (2006.01)
*G06N 20/00* (2019.01)
*G06T 3/40* (2006.01)

(52) U.S. Cl.
CPC ............. *G06T 5/009* (2013.01); *G06N 20/00* (2019.01); *G06T 3/4007* (2013.01); *G06T 2207/20208* (2013.01)

(58) Field of Classification Search
CPC ................... G06T 5/009; G06T 3/4007; G06T 2207/20208; G06N 20/00
USPC .......................................................... 382/110
See application file for complete search history.

(56) References Cited

U.S. PATENT DOCUMENTS

| 2003/0184812 | A1 | 10/2003 | Minakuti et al. |
| 2018/0091700 | A1* | 3/2018 | Sugiyama ................. B41J 2/32 |
| 2020/0187406 | A1* | 6/2020 | Redden ................ A01M 21/00 |

FOREIGN PATENT DOCUMENTS

JP 2003299116 A 10/2003

* cited by examiner

*Primary Examiner* — Michael R Neff
(74) *Attorney, Agent, or Firm* — Holtz, Holtz & Volek PC

(57) ABSTRACT

The present invention provides image processing apparatus, an image processing system and an image processing method, whereby the accuracy of evaluation can be improved. Image processing apparatus for correcting a captured image includes an image acquisition unit that acquires block pixels, an image conversion unit that converts the lightness/darkness, density, luminance and color space of the image based on the RGB values contained in the block pixels, and an output unit that outputs the converted image, and the image conversion unit further includes a binarization processing unit that binarizes the image, calculates the area ration of lightness and darkness in the image, and specifies the light and dark fields, a density conversion unit that performs conversion into wavelengths corresponding to the RGB values, a luminance conversion unit that performs conversion into luminance of the maximum wavelength that is visible to human eye, and a color-space conversion unit that performs conversion into HSV values representing a color space of color tones.

11 Claims, 8 Drawing Sheets

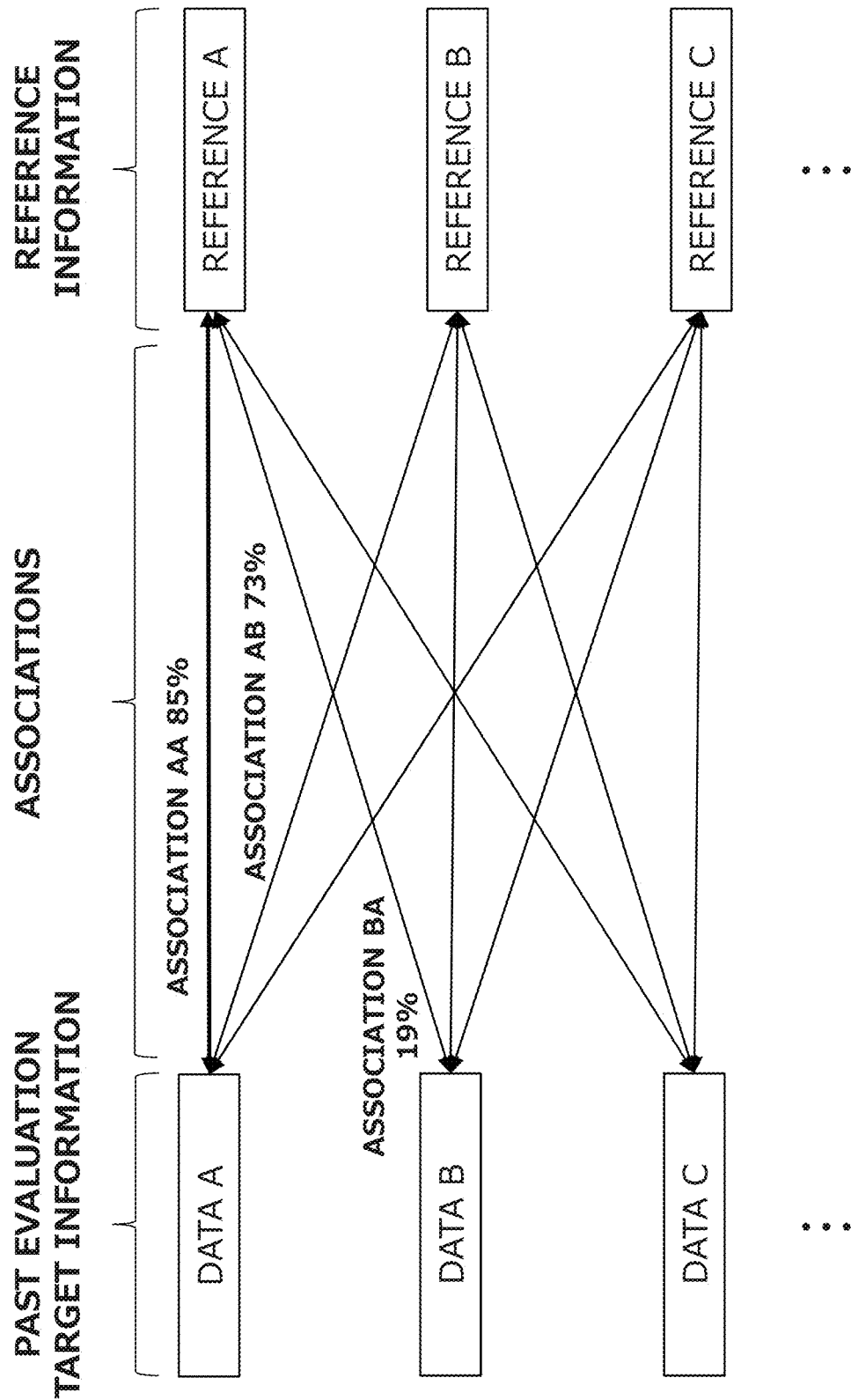

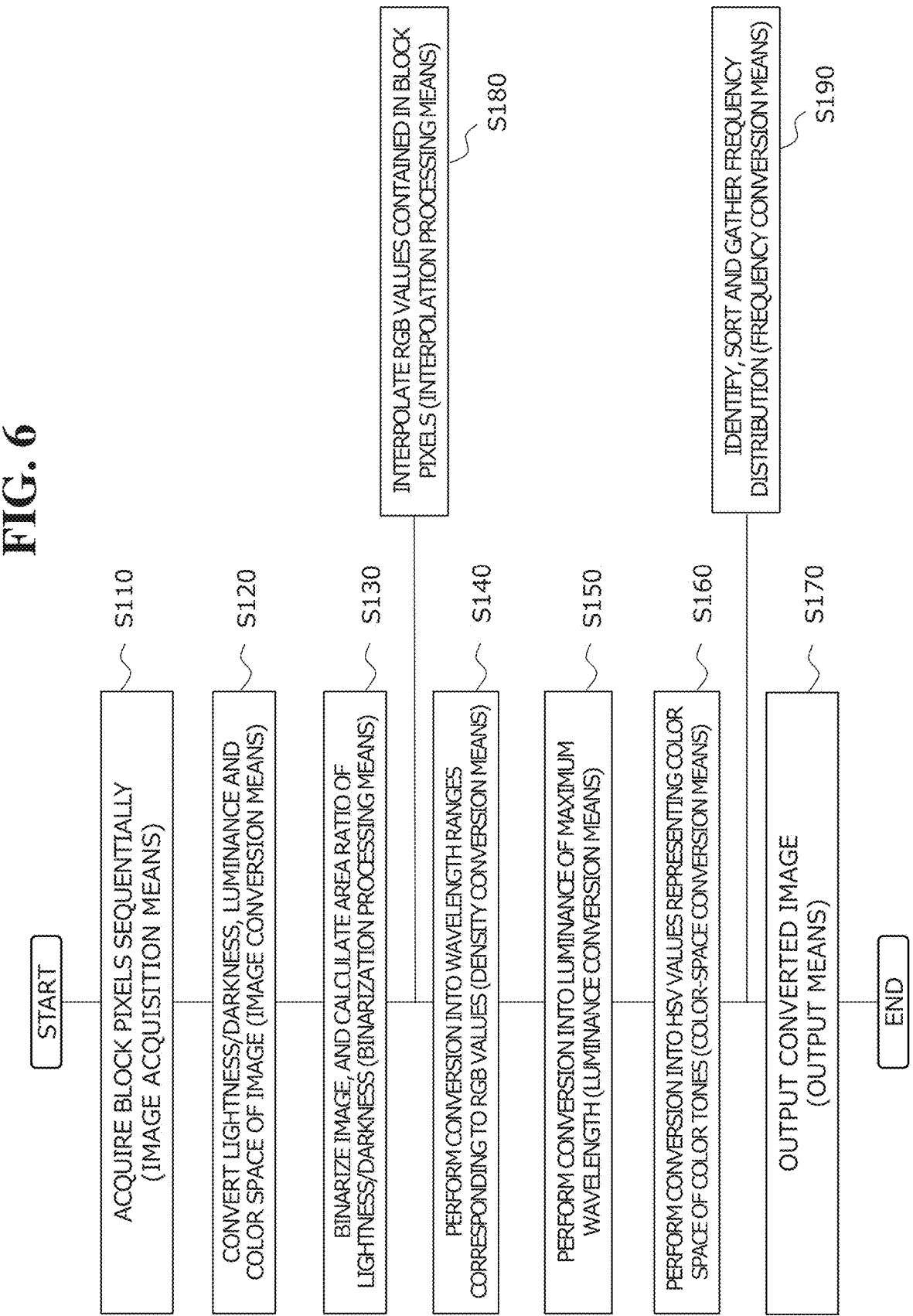

IMAGE PROCESSING APPARATUS, IMAGE PROCESSING SYSTEM, AND IMAGE PROCESSING METHOD

BACKGROUND OF THE INVENTION

Field of the Invention

The present invention relates to image processing apparatus, an image processing system and an image processing method for correcting captured images.

Description of the Related Art

Heretofore, for example, the image processing apparatus of patent literature 1 has been proposed as a device that can identify image data captured with digital cameras and/or the like, and that can output the same or similar visible gradations and color characteristics, even from different pieces of output apparatus, by taking into account the gradation characteristics.

The image processing apparatus disclosed in patent literature 1 has a determining means for determining whether an external device is a digital camera or not based on predetermined input information, a transforming means for transforming input image data into brightness and chromaticity information when the external device is determined to be a digital camera by the determining means, and a generating means for generating output image data by performing gradation transformation for enhancing contrast in a specific brightness range, for the brightness and chromaticity information, without changing the chromaticity.

CROSS-REFERENCE TO RELATED APPLICATIONS

Patent Literature 1: Japanese Unexamined Patent Application Publication No. 2003-299116

SUMMARY OF THE INVENTION

Problems to be Solved by the Invention

Now, image processing for correcting captured images is required to improve the accuracy of correction so as to acquire images that are close to human vision. In this regard, patent literature 1 only discloses a technique whereby, when it is found out that the device to acquire input image data is a digital camera, the input image data is converted into brightness/chromaticity information, and the contrast in the brightness range from the shadow to a middle tone is enhanced, without changing the brightness, and gradation transformation is performed. However, it is still not possible to improve the accuracy of correction and make the image close to human vision.

So, the present invention has been made in view of the above-mentioned problem, and it is therefore an object of the present invention to provide image processing apparatus, an image processing system and an image processing method, whereby the accuracy of correction can be improved so that images are close to human vision (human eye).

Means of Solving the Problems

The image processing apparatus according to the first invention is image processing apparatus for correction a captured image, and includes an image acquisition unit that sequentially acquires block pixels constituting the image, an image conversion unit that converts lightness/darkness, density, luminance and color space of the image based on RGB values contained in the block pixels acquired in the image acquisition unit, and an output unit that outputs the image converted in the image conversion unit, and the image conversion unit further includes a binarization processing unit that binarizes the image based on the RGB values contained in the block pixels acquired in the image acquisition unit, calculates an area ratio of lightness and darkness in the image, and sets light and dark fields to specify the light and dark fields according to the area ratio calculated, a density conversion unit that performs conversion into wavelengths corresponding to the RGB values, based on the light and dark fields set in the binarization processing unit, a luminance conversion unit that converts the RGB values contained in each wavelength range into luminance of a maximum wavelength that is visible to human eye, based on the wavelength ranges converted in the density conversion unit, and a color-space conversion unit that performs conversion into HSV values representing a color space of color tones based on the RGB values converted in the luminance conversion unit.

Based on the first invention, in the image processing apparatus according to a second invention, the image conversion unit further includes an interpolation processing unit that sub-divides the block pixels constituting the image, and interpolates each RGB value contained in the block pixels based on the sub-divided block pixels.

Based on the first invention, in the image processing apparatus according to a third invention, the image conversion unit further includes a frequency conversion unit that identifies a frequency distribution of light and shade in the image based on the RGB values acquired in the image acquisition unit, and, based on an identified result, sorts frequencies to sections of other densities, or gather the frequencies in a section of a specific density.

Based on one of the first to third inventions, the image processing apparatus according to a fourth invention further includes an acquisition unit that acquires image data having a plurality of pieces of numerical data to show the RGB values contained in the block pixels constituting the image, area-ratio data to show binarization of the image, light/dark data to show the lightness and darkness of the image, and luminance data to show the luminance of the image, a reference database that stores a training model having an association between past image data acquired in advance and reference information linked with the past image data, and an evaluation unit that references the reference database, and generates an evaluation result of the image data.

Based on the fourth invention, in the image processing apparatus according to a fifth invention, the training model is built on machine learning using the past image data and the reference information as training data.

The image processing system according to a sixth invention is an image processing system for correcting a captured image, and includes image acquisition means for sequentially acquiring block pixels constituting the image, image conversion means for converting lightness/darkness, density, luminance and color space of the image based on the RGB values contained in the block pixels acquired in the image acquisition means, and output means for outputting the image converted in the image conversion means, the image conversion means further includes binarization processing means for binarizing the image based on the RGB values contained in the block pixels acquired in the image acquisition means, calculating an area ratio of lightness and darkness in the image, and setting light and dark fields to specify the light and dark fields according to the area ratio calculated, density conversion means for performing conversion into wavelengths corresponding to the RGB values, based on the light and dark fields set in the binarization processing means, luminance conversion means for converting the RGB values contained in each wavelength range into luminance of a maximum wavelength that is visible to human eye, based on the wavelength ranges converted in the density conversion means, and color-space conversion means for performing conversion into HSV values representing a color space of color tones based on the RGB values converted in the luminance conversion means.

The image processing method according to a seventh invention is an image processing method for correcting a captured image, and includes an image acquisition step of sequentially acquiring block pixels constituting the image, an image conversion step of converting lightness/darkness, density, luminance and color space of the image based on RGB values contained in the block pixels acquired in the image acquisition step, and an output step of outputting the image converted in the image conversion step, and the image conversion step further includes a binarization processing step of binarizing the image based on the RGB values contained in the block pixels acquired in the image acquisition step, calculating an area ratio of lightness and darkness in the image, and setting light and dark fields to specify the light and dark fields according to the area ratio calculated, a density conversion step of performing conversion into wavelengths corresponding to the RGB values, based on the light and dark fields set in the binarization processing step, a luminance conversion step of converting the RGB values contained in each wavelength range into luminance of a maximum wavelength that is visible to human eye, based on the wavelength ranges converted in the density conversion step, and a color-space conversion step of performing conversion into HSV values representing a color space of color tones based on the RGB values converted in the luminance conversion step.

Effects of the Invention

According to the first to fifth inventions, the image conversion unit converts the lightness/darkness, density, luminance and color space of the image based on the RGB values contained in the block pixels. Consequently, it is possible to convert the image in wavelength ranges that are visible to human eye. By this means, it is possible to improve the accuracy of correction and make the image close to human vision.

In particular, according to the second invention, the interpolation processing unit sub-divides the block pixels constituting the image. Consequently, each RGB value contained in the sub-divided block pixels can be interpolated. By this means, the number of block pixels to constitute the image can be increased, so that it is possible to improve the accuracy of correction and make the image close to human vision.

In particular, according to the third invention, the frequency conversion unit identifies the distribution of frequencies of light and shade in the image. Consequently, based on the identified result, the frequencies can be divided among sections of other densities, or can be gathered in a section of a specific density. By this means, it is possible to improve the accuracy of correction according to the distribution of frequencies of light and shade in the image.

In particular, according to the fourth invention, the image data has a plurality of pieces of numerical data to show the RGB values contained in the block pixels constituting the image, area-ratio data to show binarization of the image, light/dark data to show the lightness and darkness of the image, and luminance data to show the luminance of the image. Consequently, it is possible to evaluate the image data based on overall imaging state of the image to be corrected. By this means, the efficiency of image processing for video and images can be improved significantly. Also, it is possible to improve the accuracy of correction and make the image close to human vision. Consequently, it is possible to expand, dramatically, the types of evaluation-target images that can be evaluated.

In particular, according to the fifth invention, the training model is built on machine learning using past image data and reference information as training data. Consequently, in addition to the huge amount of past image data, even when unknown image data that is different from the past image data is to be evaluated, quantitative evaluation can be performed. By this means, it is possible to further improve the accuracy of evaluation.

In particular, according to the sixth invention, the image conversion means converts the lightness/darkness, density, luminance and color space of the image based on the RGB values contained in the block pixels. Consequently, it is possible to convert the image in wavelength ranges that are visible to human eye. By this means, it is possible to improve the accuracy of correction and make the image close to human vision.

According to the seventh invention, the image conversion step converts the lightness/darkness, density, luminance and color space of the image based on the RGB values contained in the block pixels. Consequently, it is possible to convert the image in wavelength ranges that are visible to human eye. By this means, it is possible to improve the accuracy of correction and make the image close to human vision.

BRIEF DESCRIPTION OF THE DRAWINGS

FIG. 5 is a schematic diagram to show an example of a reference database according to the first embodiment;

FIG. 6 is a flowchart to show an example of the operation of the image processing system according to the first embodiment.

DESCRIPTION OF THE EMBODIMENTS

Hereinafter, examples of the image processing apparatus, image processing system and image processing method according to embodiments of the present invention will be described below with reference to the accompanying drawings.

Examples of image processing apparatus 1 and an image processing system 100 according to the first embodiment will be described below with reference to FIG. 1.

Figure 1:
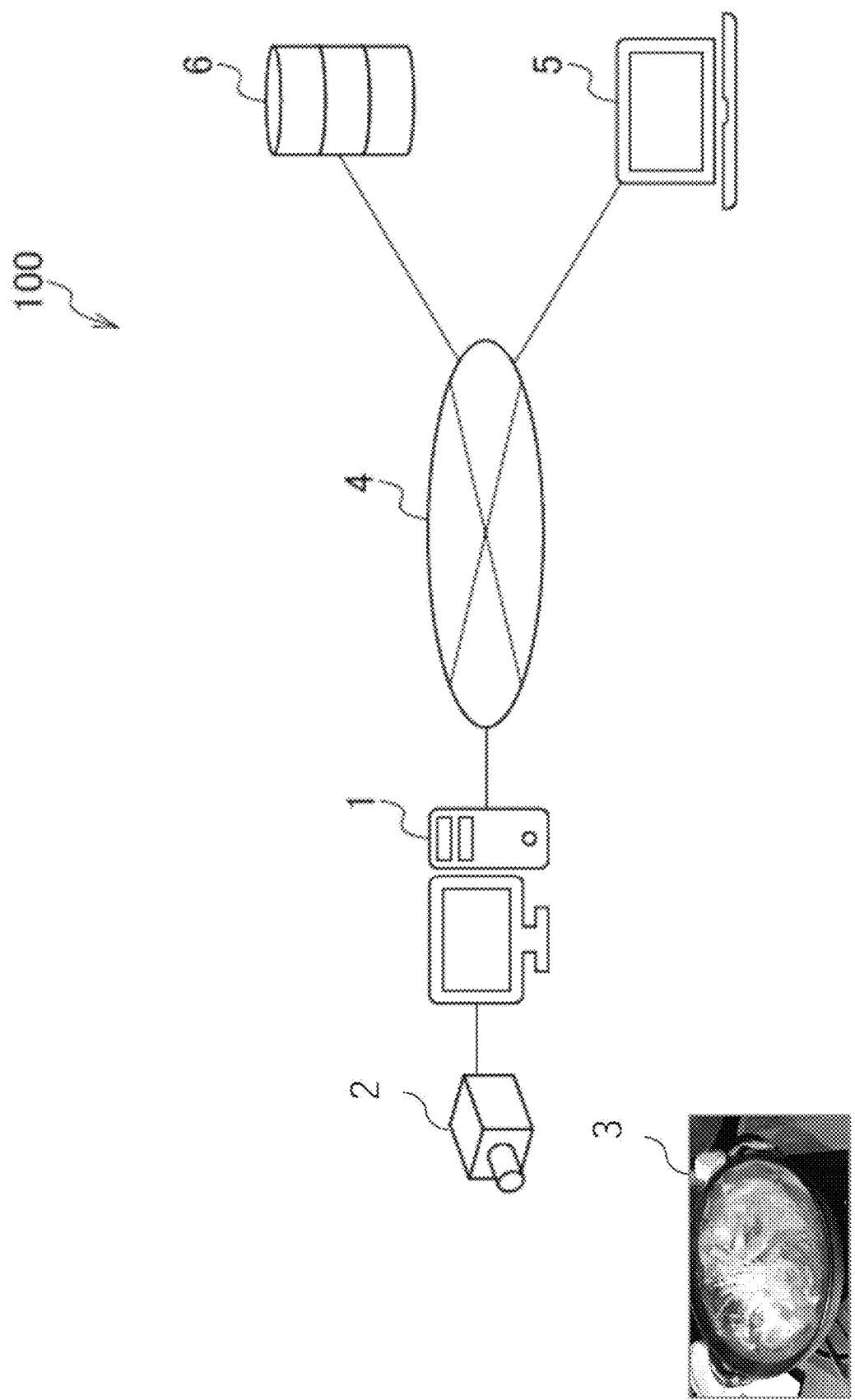
FIG. 1 is a schematic diagram to show an example of an image processing system according to the first embodiment.

The image processing system 100 according to the first embodiment has image processing apparatus 1 as shown in FIG. 1, for example. The image processing apparatus 1 may be connected with, for example, imaging apparatus 2, and may be also connected with other terminals 5 or a server 6 via, for example, a communication network 4.

The image processing apparatus 1 acquires image data of an image 3, in which an image of an imaging object is captured. The image processing apparatus 1 acquires the value of the brightness of each element R (red), G (green) and B (blue) in the RGB color space contained in the image data. In the image processing apparatus 1, the acquired image data of the image 3 is stored in a storage device such as a computer's hard disk, and, when arithmetic processing of the image data such as correction is performed, loaded as appropriate into the working memory of the image processing apparatus 1.

The image processing apparatus 1 sequentially scans a plurality of block pixels contained in the acquired image data constituting the acquired image 3. Based on the result of scanning, the image processing apparatus 1 corrects the image 3, as appropriate, by converting the lightness/darkness, density, luminance and color space of the image 3 based on the RGB values contained in each of the block pixels. The image processing apparatus 1 can be used, for example, as processing apparatus for correcting the image data of the image 3, and can also be used as evaluation apparatus for evaluating the image data of the image 3 acquired in the image processing apparatus 1.

Figure 2:
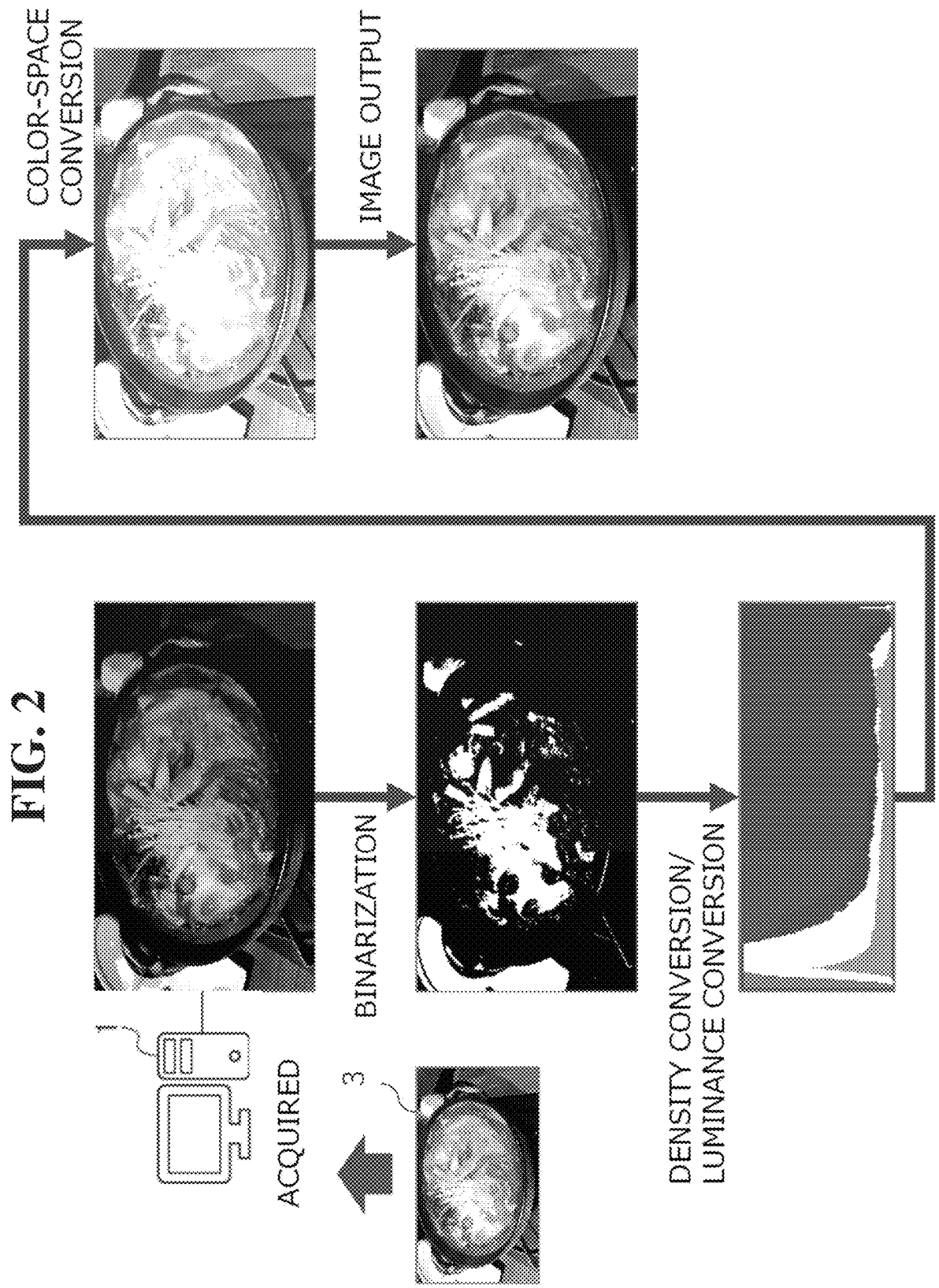
FIG. 2 is a schematic diagram to show an example of the operation of the image processing apparatus according to the first embodiment.

As shown in FIG. 2, for example, the image processing apparatus 1 takes an image of an object, acquires the image data to constitute the image 3, and then performs the binary conversion process, density conversion process, luminance conversion process, color space conversion process, interpolation process and frequency conversion process (described later), and, following these processes, outputs the corrected and converted image data.

The image processing apparatus 1 references a reference database (described later), and generates an evaluation result of the image data constituting the image 3. The image processing apparatus 1 outputs, for example, image information that corresponds to an evaluation result (in FIG. 2, default image data that have been subjected to density conversion/luminance conversion is output). The image data has a variety pieces of data linked with the captured image data, including, for example, numerical data to show the RGB values contained in block pixels, luminance data to show the luminance of the image 3, location data related to the location and environment where the image was taken, and photographing data such as photographing conditions, setting values and so forth.

The image data is a plurality of block pixels constituting the image 3, and adopts formats such as bitmap format, JPEG format and so forth. The image data is represented as a list/set of points called "colored dots", and divided into small dots in a grid pattern. Information such as color and luminance is attached to every one of these points, thereby representing the whole image.

The image data is data that is represented by the three primary colors of RGB constituting the image 3, and that, when converted into JPEG-format image data, is usually divided into image components such as color difference and luminance.

In the event the image data is a full-color image such as a photograph to which JPEG format is applicable, the image data, for example, has a smaller degree of color change than the luminance Consequently, the color components are differentiated from the luminance, and the color components alone are punctured at certain intervals. What proportion of the image data is punctured can be specified by a parameter called "sampling factor." The sampling factor usually has the value 1 or 2, and holds horizontal (H) and vertical (V) values for each component.

When the image data is converted into a JPEG-format file, for example, the image components are disassembled and divided (sampled) into small, square-pieces of image data. With the image data, depending on the sampling factor, for example, the value obtained by multiplying the maximum sampling factor, among the components of the image data constituting the image 3, by 8, is the length of one side of a small image.

The image data may include, for example, data of the photographer who took the image 3, photographing-device data, location data, time data, and so forth.

The image data has, for example, location data and color data of the image 3 to be evaluated, as taken from two or more different directions. In this case, the accuracy of the relative-location relationship per location data can be improved.

Figure 3A:
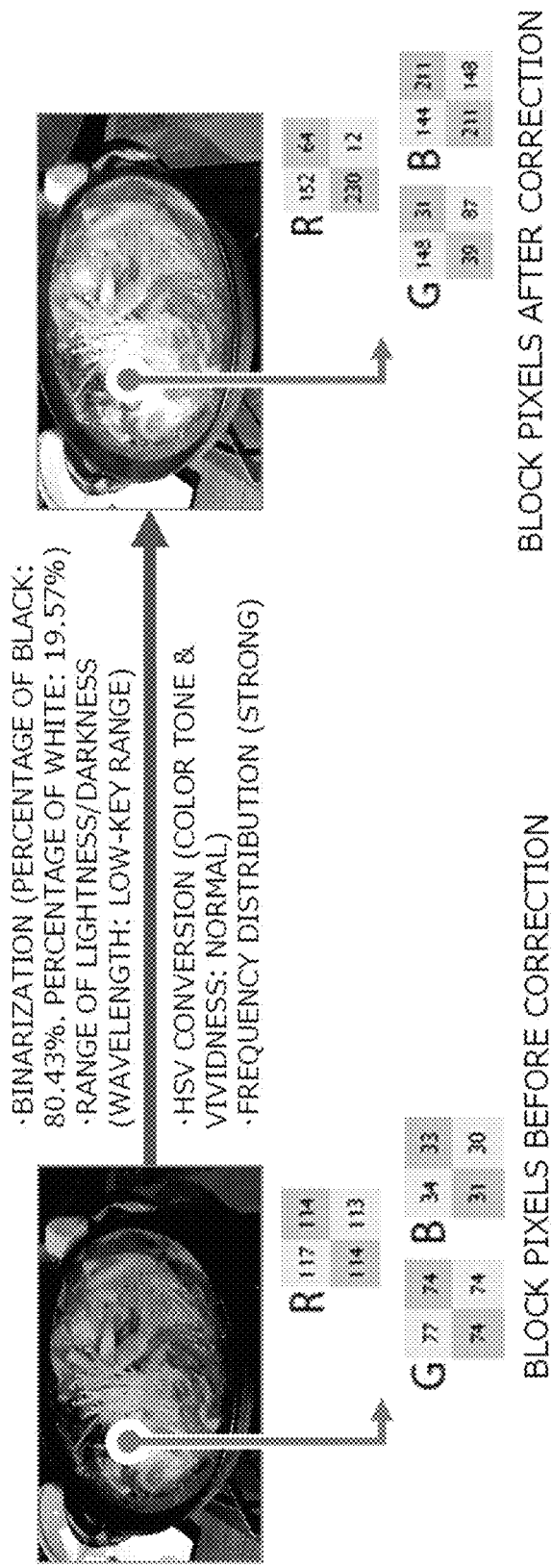
FIGS. 3A and 3B are schematic diagrams to show examples of outputs of the image processing apparatus according to the first embodiment.

As shown in FIG. 3A, for example, the image processing apparatus 1 sequentially scans each RGB value before correction, contained in a plurality of block pixels constituting the image data, based on the acquired image data constituting the image 3. The image processing apparatus 1 binarizes the acquired image data of the image 3, and calculates the area ratio of lightness and darkness in the image data. The image processing apparatus 1 specifies the light and dark fields based on the area ratio calculated, sets light and dark fields with a higher proportion of black (such that the percentage of black is 80.43% and the percentage of white is 19.57%), converts the wavelength ranges corresponding to the RGB values into low-wavelength ranges that are shown as relative sensitivity (wavelength: low-key range) based on the light and dark fields set, converts the RGB values contained in each wavelength range into the luminance of the maximum wavelength that is visible to human eye, based on the converted wavelength ranges, and, based on the converted RGB values of the maximum wavelength, performs conversion into HSV values to show high luminance (color tone and vividness: normal) in the color space of color tones.

Also, the image processing apparatus 1 sub-divides each block pixel of the image data constituting the image 3, and, based on these sub-divided block pixels, interpolates each RGB value contained in the block pixels. The image processing apparatus 1 identifies the distribution of frequencies of light and shade in the image based on the acquired RGB values, and, if a specific density has an uneven section, the frequency is divided among sections of other densities (frequency distribution: strong).

Next, the image processing apparatus 1 outputs image data containing block pixels with the corrected RGB values, as a corrected image 3.

Figure 3B:
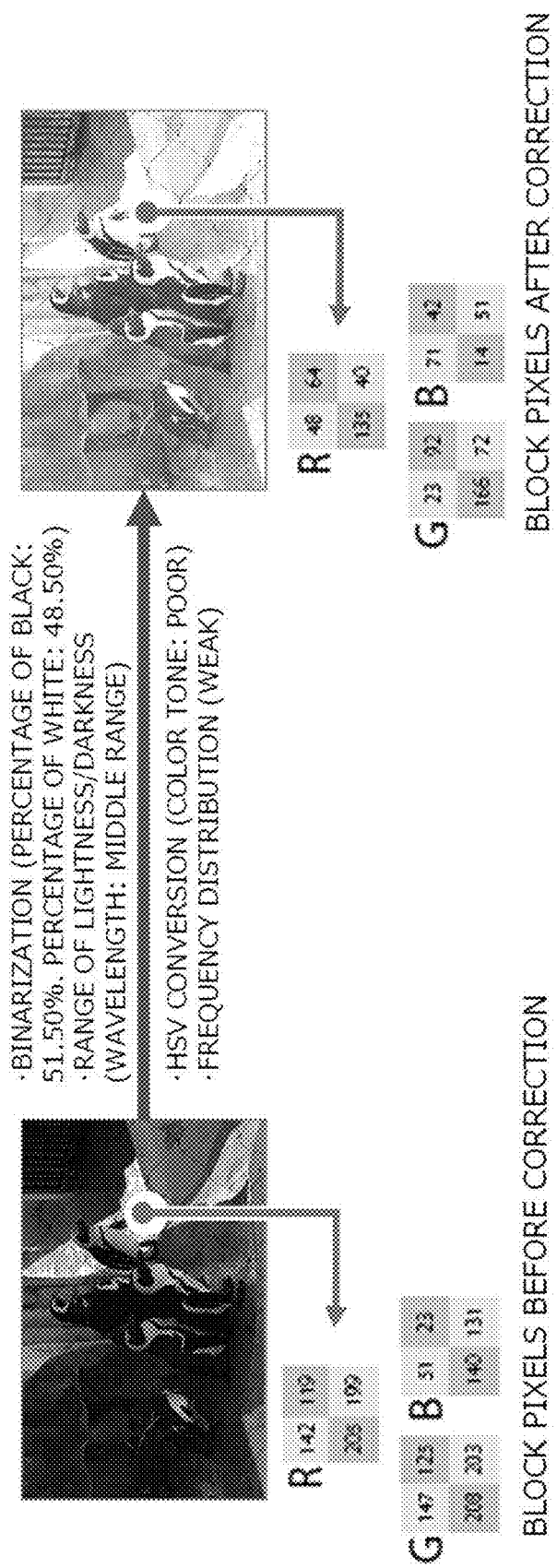

Also, as shown in FIG. 3B, for example, based on the acquired image data constituting the image 3, the image processing apparatus 1 sequentially scans the RGB values before correction, contained in a plurality of block pixels constituting the image data. The image processing apparatus 1 binarizes the acquired image data of the image 3, and calculates the area ratio of lightness and darkness in the image data. The image processing apparatus 1 specifies the light and dark fields based on the area ratio calculated, sets light and dark fields where black and white have close proportions (the percentage of black is 51.50% and the percentage of white is 48.50%), converts the wavelength ranges corresponding to the RGB values into middle-wavelength ranges that are shown as relative sensitivity (wavelength: middle range), based on the light and dark fields set, converts the RGB values contained in each wavelength range into the luminance of the maximum wavelength that is visible to human eye, based on the converted wavelength ranges, and, based on the converted RGB values of the maximum wavelength, performs conversion into HSV values to show low luminance (color tone: poor) in the color space of color tones.

Also, the image processing apparatus 1 sub-divides each block pixel of the image data constituting the image 3, and, based on these sub-divided block pixels, interpolates each RGB value contained in the block pixels. The image processing apparatus 1 identifies the distribution of frequencies of light and shade in the image based on the acquired RGB values, and, if the distribution of frequencies is low in sections of a plurality of densities, the frequencies are gathered in a section of a specific density (frequency distribution: strong).

Next, the image processing apparatus 1 outputs image data containing block pixels with the corrected RGB values, as a corrected image 3.

(Image Processing Apparatus 1)

Figure 4A:
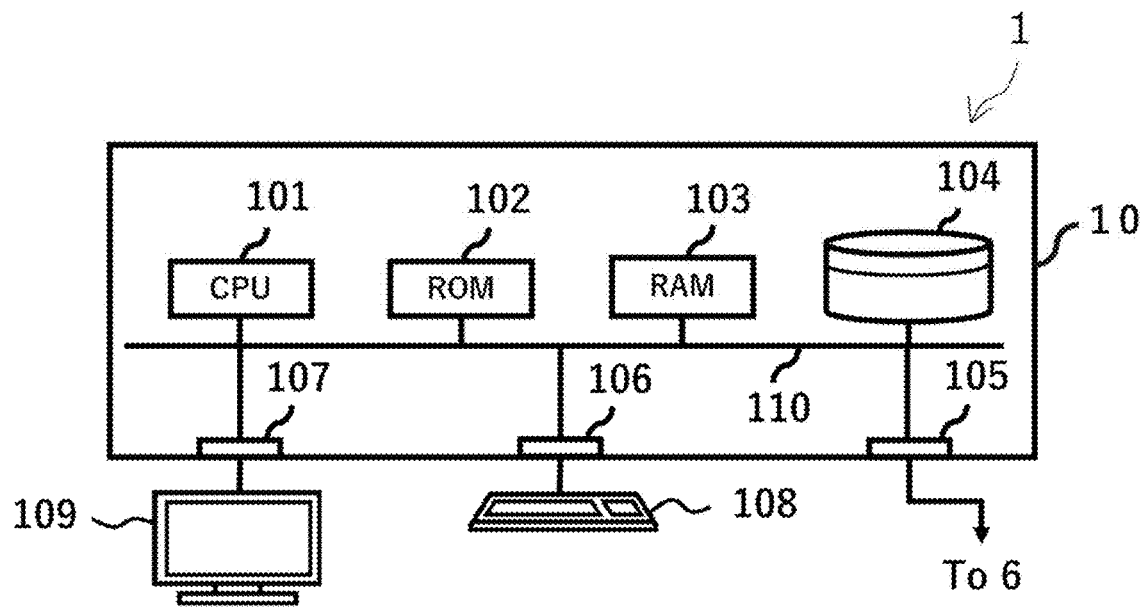
FIG. 4A is a schematic diagram to show an example of the configuration of the image processing apparatus according to the first embodiment.
Figure 4B:
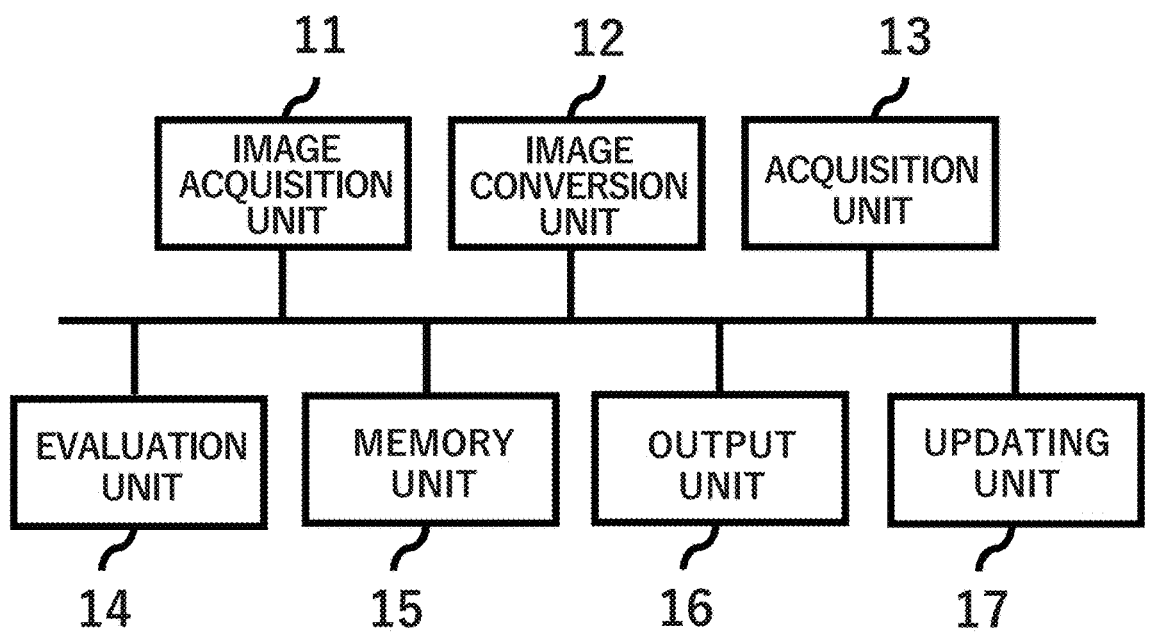
FIG. 4B is a schematic diagram to show examples of the functions of the image processing apparatus according to the first embodiment.

Next, an example of the image processing apparatus 1 according to the first embodiment will be described with reference to FIG. 4. FIG. 4A is a schematic diagram showing an example of the configuration of the image processing apparatus 1 according to the first embodiment, and FIG. 4B is a schematic diagram to show examples of the functions of the image processing apparatus 1 according to the first embodiment.

For the image processing apparatus 1, for example, an electronic device such as a personal computer (PC) may be used, and, in addition, an electronic device such as a smartphone, a tablet terminal, a wearable terminal or an IoT (Internet of Things) device, a single-board computer such as Raspberry Pi (registered trademark) and/or the like may be used. As shown in FIG. 4A, for example, the image processing apparatus 1 includes a housing 10, a CPU (Central Processing Unit) 101, a ROM (Read Only Memory) 102, a RAM (Random Access Memory) 103, a storage unit 104 and I/Fs 105 to 107. The components 101 to 107 are connected via an internal bus 110

The CPU 101 controls the whole image processing apparatus 1. The ROM 102 stores the operation code of the CPU 101. The RAM 103 is the working area that is used during the operation of the CPU 101. The storage unit 104 stores a variety of types of information, such as image data, reference database, and so forth. For the storage unit 104, for example, in addition to an HDD (Hard Disk Drive), a data storage device such as an SSD (Solid State Drive) or a floppy disk is used. Note that, for example, the image processing apparatus 1 may have a GPU (Graphics Processing Unit) (not shown). Having a GPU enables faster arithmetic processing than usual.

The I/F 105 is an interface for transmitting and receiving a variety of types of information with the imaging apparatus 2, and may also be an interface for transmitting and receiving a variety of types of information with other terminals 5, a servers 6 and so forth, via a communication network 4 such as the Internet. The I/F 106 is an interface for transmitting and receiving information with the input part 108. For example, a keyboard is used as the input part 108, and the administrator of the image processing apparatus 1 inputs a variety of types of information or control commands for the image processing apparatus 1 via the input part 108. The I/F 107 is an interface for transmitting and receiving a variety of types of information with the output part 109. The output part 109 outputs a variety of types of information stored in the storage unit 104, the processing status in the image processing apparatus 1, and so on. A display is used as the output part 109, and this may be, for example, a touch panel type.

<Reference Database>

A training model is stored in the reference database stored in the storage unit 104. The training model shows associations between past image data that is acquired in advance, and reference information that is linked with the past image data. For example, past image data and reference information may be stored in the reference database. The training model, for example, makes past image data and reference information a pair of training data, and is built on machine learning using a plurality of pairs of training data. For the learning method, for example, deep learning such as a convolutional neural network is used.

In this case, for example, the associations show the degrees of many-to-many associations between data. The associations are updated as appropriate over the course of machine learning. Consequently, the training model represents, for example, a classifier having associations (for example, functions) that are optimized based on past image data and reference information. Consequently, evaluation results of image data are generated by using a training model that is built based on all the evaluation results of the imaging state of images 3 that have been subjected to evaluation in the past. By this means, even when an image 3 to be evaluated has a complex imaging state, an optimal evaluation result can be generated. Also, when the image data is the same as or similar to past image data, or even when it is dissimilar, it is still possible to generate an optimal evaluation result quantitatively. Note that, by increasing the capability of generalization when machine learning is performed, it becomes possible to improve the accuracy of correction and make images close to human vision.

Note that the associations may refer to a plurality of associations that show the degree of connection between each piece of past image data and each piece of reference information, for example. The degrees of association can correspond to weight variables, for example, when the training model is built on a neural network.

The past image data shows the same type of information as the image data described above. The past image data has, for example, a plurality of pieces of image data that were acquired when an evaluation-target image 3 was evaluated in the past.

The reference information represents information about the imaging state of the image 3, the correction of which is to be evaluated, and which is linked with past image data. The reference information includes, for example, default images to show binarized information representing the type and state of the image 3 to be evaluated (for example, "the percentage of black: XX %", "the percentage of white: XX %", etc.), and show optimal values for the area ratio of lightness and darkness, default images to show optimal values for the number of pixels (for example, "vertical/ horizontal: 25 px", "vertical/horizontal: 50 px", etc.) for the block pixels constituting the image 3 to be evaluated, and show optimal values for the numerical images of divided block pixels, arithmetic images and numerical images after processing, default images to show images of each wavelength range representing the degree of lightness and darkness of the block pixels constituting the image 3 to be evaluated (for example, "low-key tone: 460 nm to 499 nm", "half tone: 500 nm to 549 nm", or "high-key tone: 550 nm to 560 nm"), and show optimal values for each wavelength range, default images to show optimal values for color correction for the type and state of colors of HSV values converted based on the RGB values of the block pixels constituting the image 3 to be evaluated (for example, "poor vividness", "poor color tone", or "normal color tone & vividness", and so forth), default images to show optimal values for the edge strength and state of the type and state (for example, "strong", "weak", or "normal") of the skeleton (edge enhancement) representing the frequency distribution of the RGB values of the block pixels constituting the image 3 to be evaluated, and so forth. Note that the specific contents and settings contained in the reference information, and the default images of various optimal values can be added or set arbitrarily.

As shown in FIG. 5, for example, associations may show the degrees of connection between past image data and reference information. In this case, by using associations, a plurality of pieces of data ("data A" to "data C" in FIG. 5) contained in the past image data may be each linked and stored with the degrees of association between a plurality of pieces of data ("reference A" to "reference C" in FIG. 5) contained in the reference information. Consequently, for example, by using associations, it is possible to link one piece of data contained in past image data with a plurality of pieces of data contained in reference information, so that it is possible to generate evaluation results from multiple perspectives.

Associations include, for example, a plurality of degrees of associations, which link between a plurality of pieces of data contained in past image data, and a plurality of pieces of data contained in reference information. The degrees of associations are expressed in percentage or in three or more levels, such as ten levels, five levels and son on, and are represented by, for example, the characteristics (for example, thickness) of lines. For example, "data A" contained in the past image data shows its degree of association AA with "reference A" contained in the reference information, which is "85%", and shows its degree of its association AB with "reference B" contained in the reference information, which is "73%". Also, for example, "data B" contained in the past image data shows its degree of association BA with "reference A" contained in the reference information", which is 19%. That is, "the degree of association" shows how strongly each piece of data is connected, and, for example, the higher the degree of association, the stronger the connection of each data. Note that, when a training model is built on the machine learning described above, associations may be given in three or more levels of degrees of associations.

Past image data may be divided into past location data and past color data, for example, and stored in the reference database (not shown). In this case, the degree of association is calculated based on the relationship between the combination of past location data and past color data, and the reference information. Note that, in addition to the above, the past image data may be stored in the reference database by dividing at least one of the past location data and the past color data.

For example, the combination of "location A" contained in the past location data and "color A" contained in the past color data shows its degree of association AAA with "reference A", which is "63%", and shows its degree of association ABA with "reference B", which is "63%". In this case, the data can be stored by separating between the past location data and the past color data. Consequently, when generating evaluation results, it is possible to improve the accuracy and expand the range of options.

Associations may cover, for example, synthetic data and similarity (not shown). Synthetic data is represented by three or more levels of similarity to past location data or past color data. Synthetic data is stored in the reference database in the form of numerical values, matrices, histograms and/or the like, or may be stored in the form of, for example, images, character strings and so forth.

FIG. 4B is a schematic diagram to show examples of the functions of the image processing apparatus 1. The image processing apparatus 1 includes an image acquisition unit 11, and includes, as an image conversion unit 12, a binary conversion unit, a density conversion unit, a luminance conversion unit, a color-space conversion unit, an interpolation processing unit and a frequency conversion unit. Also, the image processing apparatus 1 includes an acquisition unit 13, an evaluation unit 14, a memory unit 15 and an output unit 16, and may have, for example, an updating unit 17. Note that each function shown in FIG. 4B may be implemented as the CPU 101 executes programs stored in the storage unit 104 or the like using the RAM 103 as a working area, and may be controlled by artificial intelligence, for example.

<Image Acquisition Unit 11>

The image acquisition unit 11 sequentially acquires a plurality of block pixels constituting the image data of the image 3. The image acquisition unit 11 acquires the image data of the image 3 from the imaging apparatus 2 or the like, and also acquires the image data from, for example, a built-in imaging unit (not shown). Note that how often and in what cycle the image acquisition unit 11 acquires the image data of the image 3 are arbitrary.

The image acquisition unit 11 receives a variety of types of information transmitted to the image processing apparatus 1. The image acquisition unit 11 may receive a variety of types of information such as image data transmitted from external terminals such as other terminals 5 via, for example, the communication network 4 and the I/F 105.

<Image Conversion Unit 12>

In the image conversion unit 12, the image data of the image 3 acquired in the image acquisition unit 11 undergoes a variety of conversions. The image conversion unit 12 includes, for example, a binary conversion unit, a density conversion unit, a luminance conversion unit, a color-space conversion unit and a frequency conversion unit.

<Binary Conversion Unit>

The binary conversion unit converts the block pixels into binarized data format based on the RGB values contained in the block pixels acquired in the image acquisition unit 11. The binary conversion unit calculates the area ratio of lightness and darkness in the whole image of the image 3 based on the block pixels constituting the binarized image. The area ratio is represented by, for example, the area ratios shown in FIG. 3A and FIG. 3B (in which the percentage of black is 80.43%, the percentage of white is 19.57%, and so on).

The binary conversion unit specifies the target part based on the calculated area ratio of the image 3 (what proportion of the area black and white each occupy), assuming that a low-wavelength band (low-key range: for example, 460 nm to 499 nm) is the dark portion, a high-wavelength band (high-key range: for example, 550 nm to 560 nm) is the light portion, and a middle band (middle range: 500 nm to 549 nm) is the middle portion between the dark portion (low-key range)) and the light portion (high-key range).

<Density Conversion Unit>

The density conversion unit specifies the wavelength range for the corresponding target portion based on the area ratio of the image data binarized in the binary conversion unit, and converts the density of each RGB value within the specified wavelength range. The density conversion unit converts, for example, the density of RGB values from the dark portion to the light portion.

Also, when a movie is the target for correction, the density conversion unit repeats combining a plurality of pieces of image data so that the details of images in each dark portion and light portion become clearer and the visibility becomes maximally appropriate.

<Luminance Conversion Unit>

The luminance conversion unit converts the RGB values contained in each wavelength range, into the luminance of the maximum wavelength visible to human eye, based on the wavelength ranges converted in the density conversion unit. Human perception perceives light and dark not based on the amount of light, but based substantially on the logarithm of the amount of light. Consequently, in step patterns in which the amount of reflected (transmitted) light is equal, visually, the light portion is long, and the dark portion changes rapidly. Based on the wavelength ranges converted in the density conversion unit, the luminance conversion unit converts the RGB values into luminance that is visible to human eye, in each wavelength range.

Here, human perception perceives light and dark not based on the amount of light, but based substantially on the logarithm of the amount of light, and how people perceive light and dark varies. This is different from the imaging process of normal digital cameras or the like, and therefore conversion for human visibility is required. Consequently, for conversion of the density of lightness and darkness, the density conversion unit may calculate the amount of light (luminous energy) as the time integral of luminous flux—for example, as the time integral of luminous flux over a certain period from one point in time. The luminous energy may be calculated based on, for example, a mathematical formula using Weber's ratio, which is a commonly known technique for images, Fechner's hypothesis, and the difference (Purkinje shift) between the maximum sensitivity wavelengths of scotopic vision and photopic vision.

Here, Weber's ratio is determined from, for example, the relation that the difference threshold (the smallest noticeable change in a stimulus) is proportional to the value of the original stimulus. Also, Fechner's hypothesis is determined by using the difference threshold as the unit of perception and the minimum unit of human perception, and by measuring the amount of perception indirectly by using the difference threshold as the basic unit. Given the difference in perception between two stimuli, the stimulus and the difference threshold change continuously, and, given their relationship, Fechner's hypothesis (differential equation, where the amount of perception is the logarithm of the amount of stimulus) is determined from the logarithmic function by the inverse function of the exponential function for calculating the amount of perception.

<Color-Space Conversion Unit>

Based on the RGB values converted in the luminance conversion unit, the color-space conversion unit performs conversion into HSV values, which represent the color space of each color tone of the RGB values constituting the image data of the image 3.

Here, HSV (values) refers to the method of expressing colors with three elements of "hue", "saturation", and "brightness (value/brightness)". As for the difference from RGB (values), for example, while RGB expresses colors by combining primary colors, HSV is expressed colors by a method that is intuitively easy for humans to understand, such as "vividness" and "brightness," and, furthermore, has a characteristic that hue does not change much even if the lighting conditions change. Assuming that RGB is in a range where 0.0 is the minimum amount and 1.0 is the maximum value, when, for example, a color (pixel block) in which the RGB values are defined is given, of the three RGB values, the largest value among the three RGB values is converted as MAX and the smallest value is converted as MIN.

With HSV (values), H varies from 0.0 to 360.0, and is represented by an angle along the color wheel where the hue is shown. V is the saturation and brightness that vary within the range from 0.0 to 1.0. In the angular coordinate system, H ranges from 0 to 360, and H beyond that range can be made to correspond to this range by the remainder (or modular operation) divided by 360.0.

The color-space conversion unit converts the RGB values converted in the luminance conversion unit ("what percentage the R component is, what percentage the G component is, and what percentage the B component is") into HSV values ("what color a color is (hue)), whether the color is vivid or gray (saturation), and whether the color is bright or dark (brightness)"). Consequently, based on how people see colors, color tones that are easy to understand intuitively can be calculated. By this means, it is possible to improve the accuracy of correction and make images close to human vision.

<Interpolation Processing Unit>

The interpolation processing unit sub-divides the block pixels of each RGB value constituting the image data of the image 3, and, based on the sub-divided block pixels, interpolates each RGB value contained in the block pixels. By this means, in combination with known image processing techniques (for example, "bicubic interpolation"), the shape of portions in the image 3 where the density changes, can be recorded smoothly.

Here, "bicubic interpolation" can, for example, determine the values (x, y) of desired locations (x, y) in the image data of the target image 3 by approximation from a third-order polynomial using a determinant from the pixel values of the surrounding 16 points. The interpolation processing unit sub-divides the block pixels constituting the image data (numerical image) of the image 3 (arithmetic image), and performs operation on the RGB values contained in the sub-divided block pixels. By this means, the shape of portions in the image 3 where the density of the RGB values changes can be made smooth.

<Frequency Conversion Unit>

The frequency conversion unit changes the density of the RGB values of the image data of the image 3, depending on the frequency their occurrences, and corrects the image 3. When the histogram of the image data of the image 3 is uneven and the dynamic range is extremely small, the frequency conversion unit sets, in advance, the frequency distribution which the frequency conversion unit desires to change intentionally, prepares a conversion table of both image data, and then performs image processing.

Generally speaking, the frequency distribution to be converted is easy to see when it is close to normal distribution. In this case, if the number of divided sections is large and beyond the range of the RGB values of the image data of the image 3, the same values are distributed among other sections. Furthermore, when the frequency conversion unit judges that the frequency distribution is lower than the range of the RGB values of the image data of the image 3 in sections of a plurality of densities, the frequency conversion unit performs the process of gathering these values in a section of a specific density. By this means, the edge of each RGB value of the image data of the image 3 can be identified, and each edge's light and shade can be enhanced based on the identified result.

<Acquisition Unit 13>

The acquisition unit 13 acquires the image data to be evaluated. In addition to acquiring the image data to be evaluated input from the input part 108, for example, the acquisition unit 13 may acquire the image data to be evaluated from the terminal 5 or the like, via the communication network 4, for example.

When the acquisition unit 13 performs the training method using, for example, evaluation apparatus, the acquisition unit 13 acquires a plurality of results for the test data derived in advance based on a plurality of evaluation models, and a plurality of pieces of test data. Note that, for example, a plurality of test results may be acquired by performing a process of deriving test results for the test data by using the evaluation apparatus.

<Evaluation Unit 14>

The evaluation unit 14 references the reference database, and generates an evaluation result for the image data. The evaluation unit 14 uses, for example, the image data as input data, selects optimal reference information that is linked with the solution calculated based on the training model, and generates an evaluation result based on the optimal reference information.

When referring to the reference database shown in FIG. 5, for example, the evaluation unit 14 selects data that is the same as or similar to the data contained in the image data (for example, "data A", which will be hereinafter referred to as "first data"). For the first data, data that partially matches or completely matches the image data is selected, and, in addition, for example, similar data is selected. When the image data is represented by numerical values such as a matrix, the range of numerical values included in the first data to be selected may be set in advance.

The evaluation unit 14 selects the reference information linked with the first data selected, and the degree of association (first degree of association) between the selected first data and the reference information, and generates an evaluation result based on the selected reference information and the first degree of association. Note that the first degree of association may be selected from the associations built in advance, and may also be calculated in the evaluation unit 14.

For example, the evaluation unit 14 selects the data "reference A", contained in the reference information linked with the first data "data A", and the first degree of association (the degree of association AA) between "data A" and "reference A", which is "75%". Note that the reference information and the first degree of association may contain a plurality of pieces of data. In this case, in addition to the above-mentioned "reference A" and "75%", the reference information "reference B", which is linked with the first data "data A", and the first degree of association (the degree of association AB) between "data A" and "reference B", which is "12%", may be selected, and the evaluation result may be generated based on "reference A" and "75%", and based on "reference B" and "12%".

The evaluation result may contain image data. Also, the first degree of association is represented in three or more levels such as percentage.

The evaluation unit 14, using format data such as an output format stored in advance in the storage unit 104 or the like, generate an evaluation result that shows the reference information and the first degree of association selected above, in a format (for example, a character string) understandable to the user. Note that, for example, a known technique may be used to set the format when generating the evaluation result.

The evaluation unit 14 determines the content of the evaluation result based on, for example, the first degree of association selected. For example, the evaluation unit 14 may be configured to generate an evaluation result based on reference information that is linked with a first degree of association of "50%" or higher, and not to reflect reference information that is linked with a first degree of association less than "50%", in the evaluation result. Note that, for the criteria based on the first degree of association, for example, the administrator or the like may set a threshold value or the like in advance, and the threshold range or the like can be set on an arbitrarily basis. Also, the evaluation unit 14 may determine the content of the evaluation result based on, for example, the result of calculating two or more first degrees of associations and the comparison of these two or more first degrees of associations.

<Memory Unit 15>

The memory unit 15 retrieves, as needed, a variety of types of information such as the reference database stored in the storage unit 104. The memory unit 15 stores a variety of types of information acquired or generated in the components 11, 13 and 14, in the storage unit 104.

<Output Unit 16>

The output unit 16 outputs the evaluation result. The output unit 16 transmits the evaluation result to the output part 109 via the I/F 107, and also transmits the evaluation result to other terminals 5 and elsewhere via, for example, the I/F 105. The output unit 16 outputs data to display an image to re-produce the corrected image of the image 3 to be evaluated shown in FIG. 3, for example, to the output part 109 and elsewhere.

<Updating Unit 17>

The updating unit 17 updates the reference database, for example. When the updating unit 17 newly acquires the relationship between past image data and reference information, the updating unit 17 reflects the relationship in associations. For example, when the administrator or the like judges the accuracy of the content of the evaluation result, based on the evaluation result generated in the evaluation unit 14, and the image processing apparatus 1 acquires the judged result, the updating unit 17 updates the associations included in the reference database, based on the judged result.

<Communication Network 4>

The communication network 4 is, for example, the internet network or the like, to which the image processing apparatus 1 or the like is connected via a communication circuit. The communication network 4 may be comprised of a so-called "optical fiber communication network". Also, the communication network 4 may be realized by a known communication network such as a wireless communication network, in addition to a cable communication network.

<Other Terminals 5>

As for other terminals 5, for example, ones that are realized as electronic devices are used, like the image processing apparatus 1. Other terminals 5 represent, for example, central control apparatus or the like that is capable of communicating with a plurality of pieces of image processing apparatus 1.

<Server 6>

For example, a variety of types of information described above is stored in the server 6. A variety of types of information sent via, for example, the communication network 4 is stored in the server 6. Information that is similar to that of the storage unit 104 is stored in the server 6, for example. A variety of types of information may be transmitted and received with the image processing apparatus 1, via the communication network 4. That is, for the image processing apparatus 1, the server 6 may be used, instead of the storage unit 104.

First Embodiment: An Example of the Operation of the Image Processing System 100

Next, an example of the operation of the image processing system 100 according to the first embodiment will be described. FIG. 6 is a flowchart to show an example of the operation of the image processing system 100 according to the first embodiment.

<Image Acquisition Means S110>

As shown in FIG. 2, the image data of the image 3 is acquired (image acquisition means S110). The image acquisition unit 11 may sequentially acquire a plurality of block pixels constituting the image data of the image 3.

For example, the image acquisition unit 11 may acquire image data of the image 3 from the imaging apparatus 2 or the like, and, in addition, acquire image data on a real-time basis, from, for example, a built-in imaging unit (not shown). Note that the image acquisition unit 11 may acquire the image 3 as a still image, or may acquire a movie, and, in this case, the image acquisition unit 11 acquires image data on a per image frame basis. Note that how often and in what image data is acquired are arbitrary. Also, the mode and format of the image 3 and movie are arbitrary.

<Image Conversion Means S120>

Next, the lightness/darkness, density, luminance and color space of the image are converted (image conversion means S120). The image conversion unit 12 converts the lightness/darkness, density, luminance and color space of the image 3 based on the RGB values contained in the block pixels. The image conversion unit 12 may include, for example, a binary conversion unit, a density conversion unit, a luminance conversion unit, a color-space conversion unit, and a frequency conversion unit, and perform each conversion.

<Binarization Processing Means S130>

Next, the image is binarized, and the area ratio of lightness and darkness is calculated (binarization processing means S130). The binarization processing unit identifies the RGB values contained in the block pixels, binarizes the RGB values of the image 3 based on the identified result, and calculates the area ratio of lightness and darkness (for example, black and white) in the image 3. The binarization processing unit specifies the light and dark fields based on the area ratio calculated. The light and dark fields may be set in advance in the memory unit 15 of the image processing system 1, using, for example, a data table (not shown) in which area ratios are associated with light and dark fields.

<Density Conversion Means S140>

Next, conversion into wavelength ranges corresponding to the RGB values is performed (density conversion means S140). The density conversion unit identifies the light and dark fields set in the binarization processing unit. The density conversion unit specifies the wavelength ranges based on the RGB values. Based on the identified result, the density conversion unit may perform conversion into wavelength ranges corresponding to the RGB values. The wavelength ranges may be set in advance in the memory unit 15 of the image processing system 1 in the form of, for example, a data table (not shown) in which RGB values and wavelength ranges are associated with each other.

<Luminance Conversion Means S150>

Next, conversion into the luminance of the maximum wavelength (luminance conversion means S150). The luminance conversion unit identifies the wavelength ranges converted in the density conversion unit. The density conversion unit specifies the luminance of the maximum wavelength among the RGB values based on the converted wavelength ranges. Based on the identified result, the luminance conversion unit may convert the RGB values contained in each wavelength range into the luminance of the maximum wavelength visible to human eye. The luminance of the maximum wavelength may be set in advance in the memory unit 15 of the image processing system 1 in the form of, for example, a data table (not shown) in which the wavelength ranges to include the luminance of the maximum wavelength and RGB values are associated with each other.

<Color-Space Conversion Means S160>

Next, conversion into HSV values to represent the color space of color tones (color-space conversion means S160). The color-space conversion unit identifies the RGB values converted in the luminance conversion unit. The color-space conversion unit specifies the HSV values according to the converted RGB values. The color-space conversion unit may convert the identified RGB values into HSV values representing the color space of color tones. The HSV values may be set in advance in the memory unit 15 of the image processing system 1 in the form of, for example, a data table (not shown) in which HSV values and RGB values are associated with each other.

<Output Means S170>

After that, the converted image is output (output means S170). The output unit 16 may output the image 3 converted in the image conversion unit 12, for example. The output unit 16 may output the evaluation result to the output part 109 or elsewhere, or output the evaluation result to other terminals 5 via, for example, the communication network 4.

<Interpolation Processing Means S180>

Furthermore, the RGB values contained in the block pixels are interpolated (interpolation processing means S180). The interpolation processing unit identifies and subdivides each block pixel constituting the image 3. The interpolation processing unit may interpolate each RGB value contained in the block pixels based on the sub-divided block pixels.

<Frequency Conversion Means S190>

Also, the frequency distribution is identified, sorted and gathered (frequency conversion means S190). The frequency conversion unit identifies the distribution of frequencies of light and shade in the image 3 based on the RGB values. If the frequency conversion unit judges that a specific density has an uneven section, the frequency conversion unit divides the frequency among sections of other densities. Furthermore, if the frequency distribution is low in sections of a plurality of densities, the frequency conversion unit may gather the frequencies in a section of a specific density.

By this means, the operation of the image processing system 100 according to the first embodiment may be finished.

According to the present embodiment, the image acquisition unit sequentially acquires the block pixels constituting the image 3. Consequently, the image 3 taken in a variety of environments can be acquired in detail. By this means, it is possible to improve the accuracy of correction so that the image is close to human vision (human eye).

Also, according to the present embodiment, the binarization processing unit calculates the area ratio of lightness and darkness from the binarized image 3, and specifies the light and dark fields according to the area ratio from the calculation result. Consequently, the light and dark fields of black and white in the image 3 can be identified in detail. By this means, it is possible to improve the accuracy of correction so that the image is close to human vision (human eye).

Also, according to the present embodiment, the density conversion unit converts the wavelength ranges corresponding to the RGB values. Consequently, the wavelength range of each density of the RGB values of the image 3 can be identified in detail. By this means, it is possible to improve the accuracy of correction so that the image is close to human vision (human eye).

Also, according to the present embodiment, the luminance conversion unit converts the RGB values contained in wavelength ranges. Consequently, it is possible to achieve the luminance of the maximum wavelength that is visible to human eye. By this means, it is possible to improve the accuracy of correction so that the image is close to human vision (human eye).

Also, according to the present embodiment, the color-space conversion unit performs conversion into HSV values representing the color space of color tones based on RGB values. Consequently, it is possible to show display that humans can intuitively and easily understand. By this means, it is possible to improve the accuracy of correction so that the image is close to human vision (human eye).

Second Embodiment: An Example of the Operation of the Image Processing System 100

Figure 7:
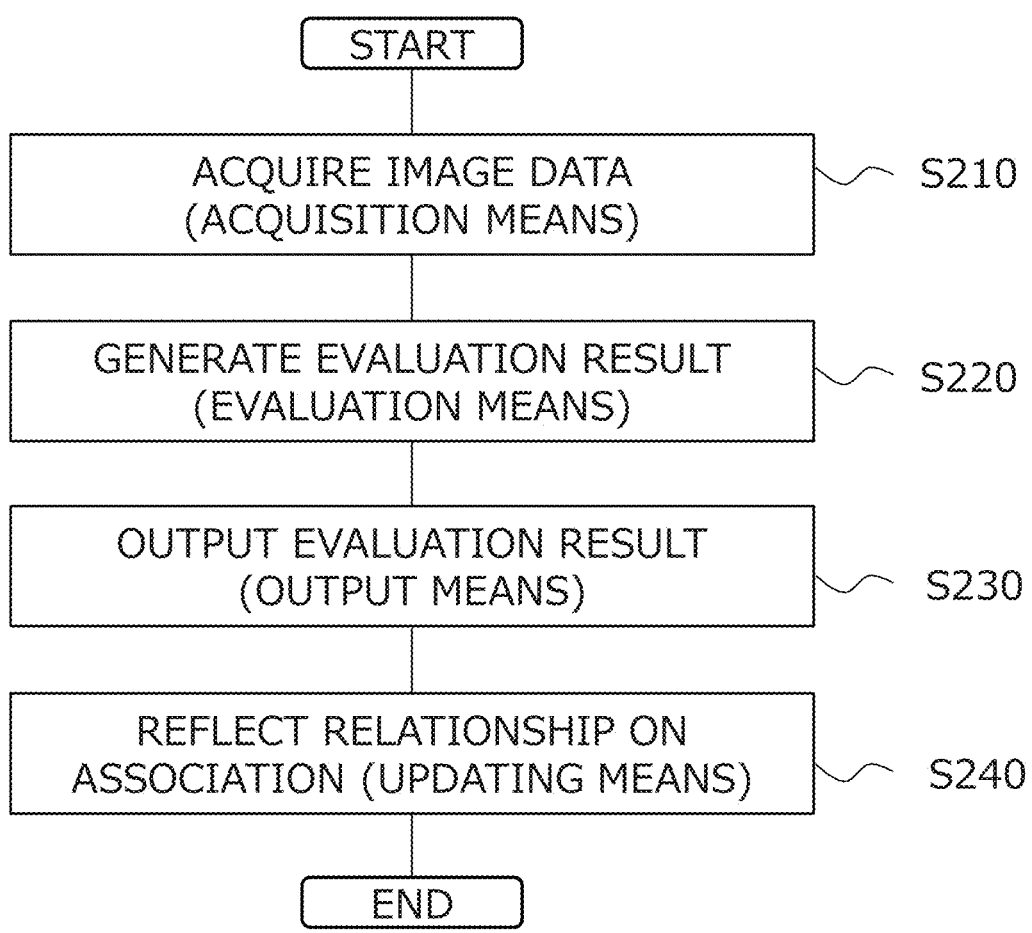
FIG. 7 is a flowchart to show an example of the operation of the image processing apparatus according to the second embodiment.

Next, an example of the operation of the image processing system 100 according to the second embodiment will be described. FIG. 7 is a flowchart to show an example of the operation of the image processing system 100 according to the second embodiment.

<Acquisition Means S210>

The acquisition unit 13 acquires image data (acquisition means S210). The acquisition unit 13 may acquire image data having a plurality of pieces of data, including numerical data to show the RGB values contained in the block pixels constituting the image 3, area-ratio data to show binarization of the image 3, light/dark data to show the lightness and darkness of the image 3, and luminance data to show the luminance of the image 3. The acquisition unit 13 stores the image data of the image 3 to be evaluated in the storage unit 104, for example, via the memory unit 15.

<Evaluation Means S220>

Next, an evaluation result is generated (evaluation means S220). The evaluation unit 14 references the reference database, and generates an evaluation result of the image data to be evaluated. The evaluation unit 14 acquires the image data of the image 3 acquired in the acquisition unit 13, and acquires, for example, the reference database stored in the storage unit 104. For example, the evaluation unit 14 uses the image data to be evaluated as input data, selects optimal reference information that is linked with the solution calculated based on the associations shown by function or the like, and generates an evaluation result based on the optimal reference information. At this time, for example, the evaluation unit 14 may select a plurality of pieces of reference information for one piece of image data to be evaluated.

The evaluation unit 14 may generate one evaluation result for one piece of evaluation-target image data, and may also generate one evaluation result for a plurality of pieces of evaluation-target image data, for example. The evaluation unit 14 generates an evaluation result using, for example, format data such as an output format stored in the storage unit 104. The evaluation unit 14 stores the evaluation result in the storage unit 104 via, for example, the memory unit 15.

<Output Means S230>

Next, the evaluation result is output (output means S230). The output unit 16 outputs the evaluation result to the output part 109 and elsewhere. The output unit 16 may output the evaluation result to other terminals 5 or the server 6, via, for example, the communication network 4.

<Updating Means S240>

Next, the relationship is reflected in the degrees of association (updating means S240). For example, when the updating unit 17 newly acquires the relationship between past evaluation-target image data and reference information, this relationship may be reflected in the associations. For example, given the evaluation result generated in the evaluation unit 14, when the evaluator or the like judges the accuracy of the evaluation result and the image processing apparatus 1 acquires the judged result, the updating unit 17 updates the associations stored in the reference database based on the judged result.

By this means, the operation of the image processing system 100 according to the second embodiment is finished. Note that the timing to implement the updating means S240 is arbitrary.

According to the present embodiment, the evaluation unit 14 references the reference database, and generates an evaluation result of the image data of the image 3. Consequently, an evaluation result that is based on past results can be generated, and, furthermore, numerical data to show the RGB values of the image 3 to be evaluated, area-ratio data to show binarization of the image 3, light/dark data to show the lightness and darkness of the image 3, and luminance data to show the luminance of the image 3 can be made subject to evaluation. By this means, it is possible to improve the accuracy of evaluation.

Also, according to the present embodiment, the training model is built on machine learning using past image data and reference information as training data. Consequently, even when evaluating unknown image data that is different from past image data, it is still possible to perform quantitative evaluation. By this means, it is possible to further improve the accuracy of evaluation.

Also, according to the present embodiment, the evaluation means S220 references the reference database, and generates an evaluation result for the image data. Consequently, an evaluation result that is based on past results can be generated, and, furthermore, numerical data to show the RGB values of the image 3 to be evaluated, area-ratio data to show binarization of the image 3, light/dark data to show the lightness and darkness of the image 3, and luminance data to show the luminance of the image 3 can be made subject to evaluation. By this means, it is possible to improve the accuracy of evaluation.

Although embodiments of the present invention have been described above, these embodiments have been presented simply by way of example, and are not intended to limit the scope of the invention. These novel embodiments can be implemented in a variety of other forms, and various omissions, replacements, and changes can be made without departing from the spirit of the invention. These embodiments and modifications thereof are included in the scope and gist of the invention, and are also included in the invention described in claims and equivalents thereof.

DESCRIPTION OF THE REFERENCE NUMERAL

1: image processing apparatus
2: imaging apparatus
3: image
4: communication network
5: terminal
6: server
10: housing
11: image acquisition unit
12: image conversion unit
13: acquisition unit
14: evaluation unit
15: memory unit
16: output unit
17: updating unit
100: image processing system
101: CPU
102: ROM
103: RAM
104: storage unit
105: I/F
106: I/F
107: I/F
108: input part
109: output part
110: internal bus
S110: image acquisition means
S120: image conversion means
S130: binarization processing means
S140: density conversion means
S150: luminance conversion means
S160: color-space conversion means
S170: output means
S180: interpolation processing means
S190: frequency conversion means
S210: acquisition method
S220: evaluation means
S230: output means
S240: updating means

What is claimed is:

1. Image processing apparatus for correcting a captured image, the apparatus comprising:
an image acquisition unit that sequentially acquires block pixels constituting the image;
an image conversion unit that converts lightness/darkness, density, luminance and color space of the image based on RGB values contained in the block pixels acquired in the image acquisition unit; and
an output unit that outputs the image converted in the image conversion unit,
wherein the image conversion unit further comprises:
a binarization processing unit that binarizes the image based on the RGB values contained in the block pixels acquired in the image acquisition unit, calculates an area ratio of lightness and darkness in the image, and sets light and dark fields to specify the light and dark fields according to the area ratio calculated;
a density conversion unit that performs conversion into wavelengths corresponding to the RGB values, based on the light and dark fields set in the binarization processing unit;
a luminance conversion unit that converts the RGB values contained in each wavelength range into luminance of a maximum wavelength that is visible to human eye, based on the wavelength ranges converted in the density conversion unit; and
a color-space conversion unit that performs conversion into HSV values representing a color space of color tones based on the RGB values converted in the luminance conversion unit.

2. The image processing apparatus according to claim 1, wherein the image conversion unit further comprises an interpolation processing unit that sub-divides the block pixels constituting the image, and interpolates each RGB value contained in the block pixels based on the sub-divided block pixels.

3. The image processing apparatus according to claim 1, wherein the image conversion unit further comprises a frequency conversion unit that identifies a frequency distribution of light and shade in the image based on the RGB values acquired in the image acquisition unit, and, based on an identified result, sorts frequencies to sections of other densities, or gather the frequencies in a section of a specific density.

4. The image processing apparatus according to claim 1, further comprising:
an acquisition unit that acquires image data having a plurality of pieces of numerical data to show the RGB values contained in the block pixels constituting the image, area-ratio data to show binarization of the image, light/dark data to show the lightness and darkness of the image, and luminance data to show the luminance of the image;
a reference database that stores a training model having an association between past image data acquired in advance and reference information linked with the past image data; and
an evaluation unit that references the reference database, and generates an evaluation result of the image data.

5. The image processing apparatus according to claim 4, wherein the training model is built on machine learning using the past image data and the reference information as training data.

6. The image processing apparatus according to claim 2, further comprising:
an acquisition unit that acquires image data having a plurality of pieces of numerical data to show the RGB values contained in the block pixels constituting the image, area-ratio data to show binarization of the image, light/dark data to show the lightness and darkness of the image, and luminance data to show the luminance of the image;
a reference database that stores a training model having an association between past image data acquired in advance and reference information linked with the past image data; and
an evaluation unit that references the reference database, and generates an evaluation result of the image data.

7. The image processing apparatus according to claim 6, wherein the training model is built on machine learning using the past image data and the reference information as training data.

8. The image processing apparatus according to claim 3, further comprising:
- an acquisition unit that acquires image data having a plurality of pieces of numerical data to show the RGB values contained in the block pixels constituting the image, area-ratio data to show binarization of the image, light/dark data to show the lightness and darkness of the image, and luminance data to show the luminance of the image;
- a reference database that stores a training model having an association between past image data acquired in advance and reference information linked with the past image data; and
- an evaluation unit that references the reference database, and generates an evaluation result of the image data.

9. The image processing apparatus according to claim 8, wherein the training model is built on machine learning using the past image data and the reference information as training data.

10. An image processing system for correcting a captured image, the system comprising:
- image acquisition means for sequentially acquiring block pixels constituting the image;
- image conversion means for converting lightness/darkness, density, luminance and color space of the image based on the RGB values contained in the block pixels acquired in the image acquisition means; and
- output means for outputting the image converted in the image conversion means,
- wherein the image conversion means further comprises:
- binarization processing means for binarizing the image based on the RGB values contained in the block pixels acquired in the image acquisition means, calculating an area ratio of lightness and darkness in the image, and setting light and dark fields to specify the light and dark fields according to the area ratio calculated;
- density conversion means for performing conversion into wavelengths corresponding to the RGB values, based on the light and dark fields set in the binarization processing means;
- luminance conversion means for converting the RGB values contained in each wavelength range into luminance of a maximum wavelength that is visible to human eye, based on the wavelength ranges converted in the density conversion means; and
- color-space conversion means for performing conversion into HSV values representing a color space of color tones based on the RGB values converted in the luminance conversion means.

11. An image processing method for correcting a captured image, the method comprising:
- an image acquisition step of sequentially acquiring block pixels constituting the image;
- an image conversion step of converting lightness/darkness, density, luminance and color space of the image based on RGB values contained in the block pixels acquired in the image acquisition step; and
- an output step of outputting the image converted in the image conversion step,
- wherein the image conversion step further comprises:
- a binarization processing step of binarizing the image based on the RGB values contained in the block pixels acquired in the image acquisition step, calculating an area ratio of lightness and darkness in the image, and setting light and dark fields to specify the light and dark fields according to the area ratio calculated;
- a density conversion step of performing conversion into wavelengths corresponding to the RGB values, based on the light and dark fields set in the binarization processing step;
- a luminance conversion step of converting the RGB values contained in each wavelength range into luminance of a maximum wavelength that is visible to human eye, based on the wavelength ranges converted in the density conversion step; and
- a color-space conversion step of performing conversion into HSV values representing a color space of color tones based on the RGB values converted in the luminance conversion step.

* * * * *